(12) United States Patent
Watté et al.

(10) Patent No.: US 10,197,745 B2
(45) Date of Patent: Feb. 5, 2019

(54) OPTICAL FIBER CONNECTION SYSTEM INCLUDING OPTICAL FIBER ALIGNMENT DEVICE

(71) Applicant: CommScope Connectivity Belgium BVBA, Kessel-Lo (BE)

(72) Inventors: Jan Watté, Grimbergen (BE); Stefano Beri, Zaventem (BE); Danny Willy August Verheyden, Gelrode (BE); Marcos Sampaio, Braga (PT); João De Oliveira Cortez, Vila Nova de Famalicáo (PT); Juergen Albert Jan Van Erps, Tervuren (BE); Evert Ludwig Bert Ebraert, Dilbeek (BE); Yu Lu, Eden Prairie, MN (US)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/512,301

(22) PCT Filed: Aug. 20, 2015

(86) PCT No.: PCT/US2015/046188
§ 371 (c)(1),
(2) Date: Mar. 17, 2017

(87) PCT Pub. No.: WO2016/043922
PCT Pub. Date: Mar. 24, 2016

(65) Prior Publication Data
US 2017/0276883 A1    Sep. 28, 2017

Related U.S. Application Data

(60) Provisional application No. 62/052,816, filed on Sep. 19, 2014, provisional application No. 62/092,021, filed on Dec. 15, 2014.

(51) Int. Cl.
*G02B 6/38* (2006.01)
*G02B 6/36* (2006.01)

(52) U.S. Cl.
CPC ......... *G02B 6/3881* (2013.01); *G02B 6/3652* (2013.01); *G02B 6/3806* (2013.01);
(Continued)

(58) Field of Classification Search
CPC .. G02B 6/3881; G02B 6/3825; G02B 6/3882; G02B 6/3885
See application file for complete search history.

(56) References Cited

U.S. PATENT DOCUMENTS

| 4,274,708 A | 6/1981 | Cocito et al. |
| 4,634,216 A | 1/1987 | Calevo et al. |

(Continued)

FOREIGN PATENT DOCUMENTS

| EP | 2 549 313 A1 | 1/2013 |
| EP | 2 549 314 A1 | 1/2013 |

(Continued)

OTHER PUBLICATIONS

Extended European Search Report for corresponding European Patent Application No. 15842022.4 dated Mar. 27, 2018, 10 pages.

(Continued)

*Primary Examiner* — John Bedtelyon
(74) *Attorney, Agent, or Firm* — Merchant & Gould P.C.

(57) ABSTRACT

A self-centering structure (300) for aligning optical fibers (308) desired to be optically coupled together is disclosed. The self-centering structure (300) including a body (310) having a first end (312) and a second end (314). The first end (312) defines a first opening (303) and the second end (314) defines a second opening (304). The self-centering structure (300) includes a plurality of groove structures (306) integrally formed in the body (310) of the self-centering struc- (Continued)

ture for receiving the optical fibers (308) and a fiber alignment region (305) positioned at an intermediate location between the first and second ends (312, 314) to facilitate centering and alignment of the optical fibers (308). The plurality of cantilever members (322) is flexible and configured for urging the optical fibers (308) into their respective groove structures (306).

23 Claims, 15 Drawing Sheets

(52) U.S. Cl.
CPC ......... *G02B 6/3825* (2013.01); *G02B 6/3882* (2013.01); *G02B 6/3885* (2013.01)

(56) References Cited

U.S. PATENT DOCUMENTS

| | | |
|---|---|---|
| 4,696,539 A | 9/1987 | Knowles |
| 4,993,800 A | 2/1991 | Shibata |
| 6,142,676 A | 11/2000 | Lu |
| 6,364,539 B1 | 4/2002 | Shahid |
| 6,516,131 B1 | 2/2003 | Tullis |
| 6,779,931 B2 | 8/2004 | Murata et al. |
| 7,641,397 B2 | 1/2010 | Koreeda et al. |
| 9,575,263 B2 * | 2/2017 | Gurreri ................ G02B 6/3809 |
| 9,575,272 B2 | 2/2017 | Ott |
| 2003/0113089 A1 | 6/2003 | Lee et al. |
| 2003/0169995 A1 | 9/2003 | Song et al. |
| 2011/0176777 A1 | 7/2011 | Chen |

FOREIGN PATENT DOCUMENTS

| | | |
|---|---|---|
| GB | 2 351 157 A | 12/2000 |
| JP | S57-139716 A | 8/1982 |
| JP | 07-230017 A | 8/1995 |
| WO | 2013/117598 A2 | 8/2013 |
| WO | 2015/063317 A1 | 5/2015 |

OTHER PUBLICATIONS

International Search Report and Written Opinion of the International Searching Authority for corresponding International Patent Application No. PCT/US2015/046188 dated Nov. 27, 2015, 10 pgs.

\* cited by examiner

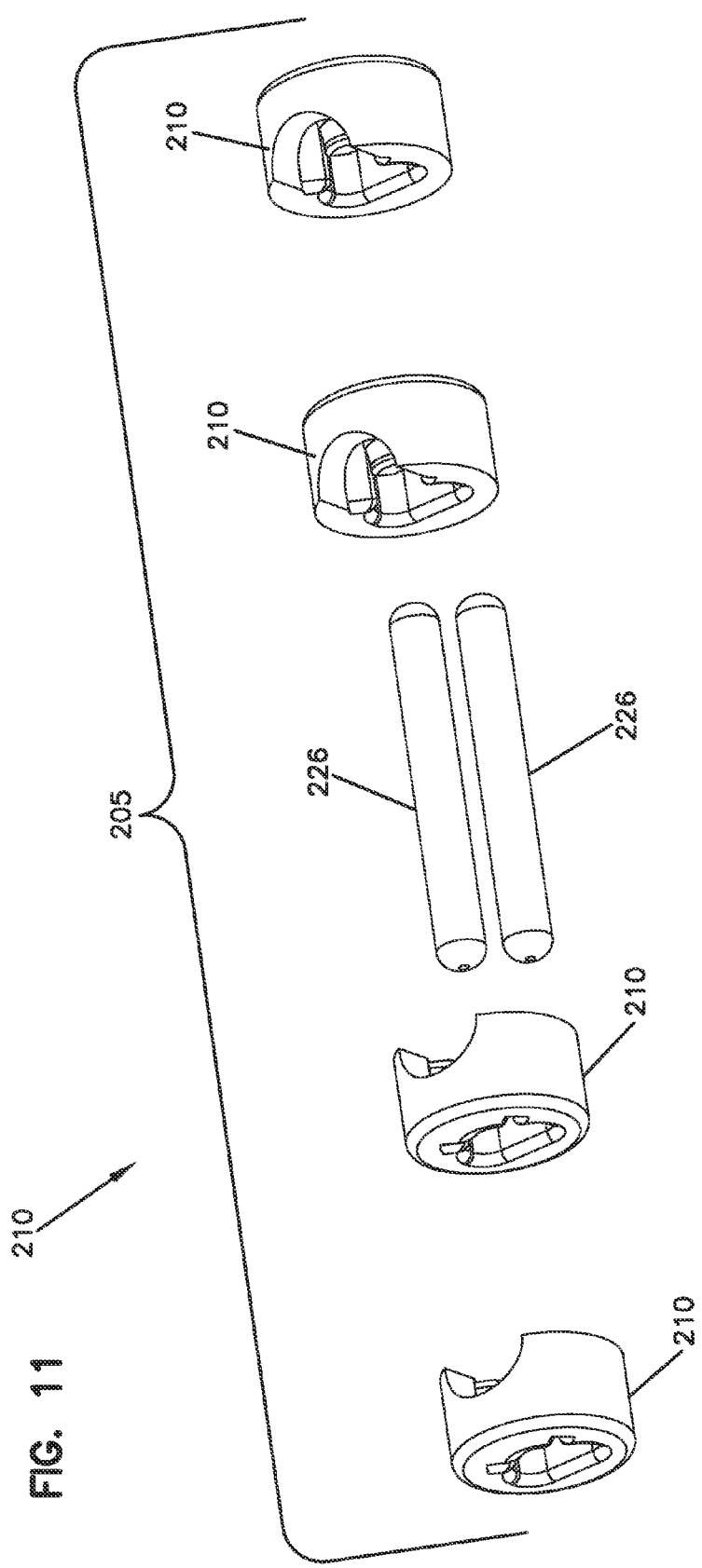

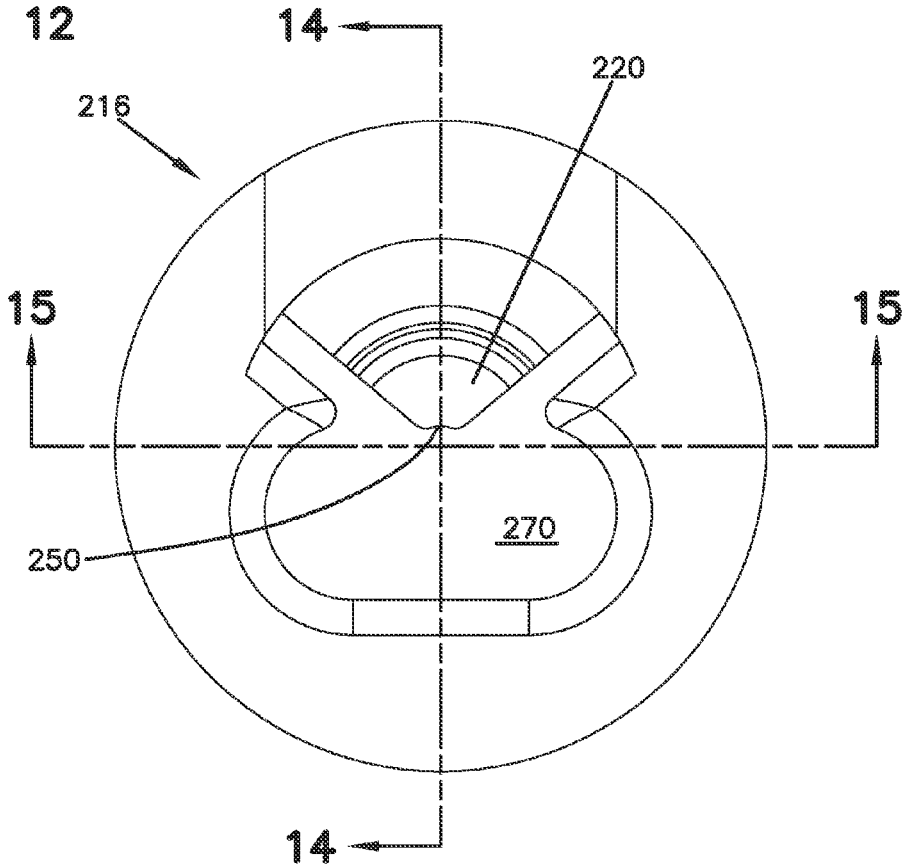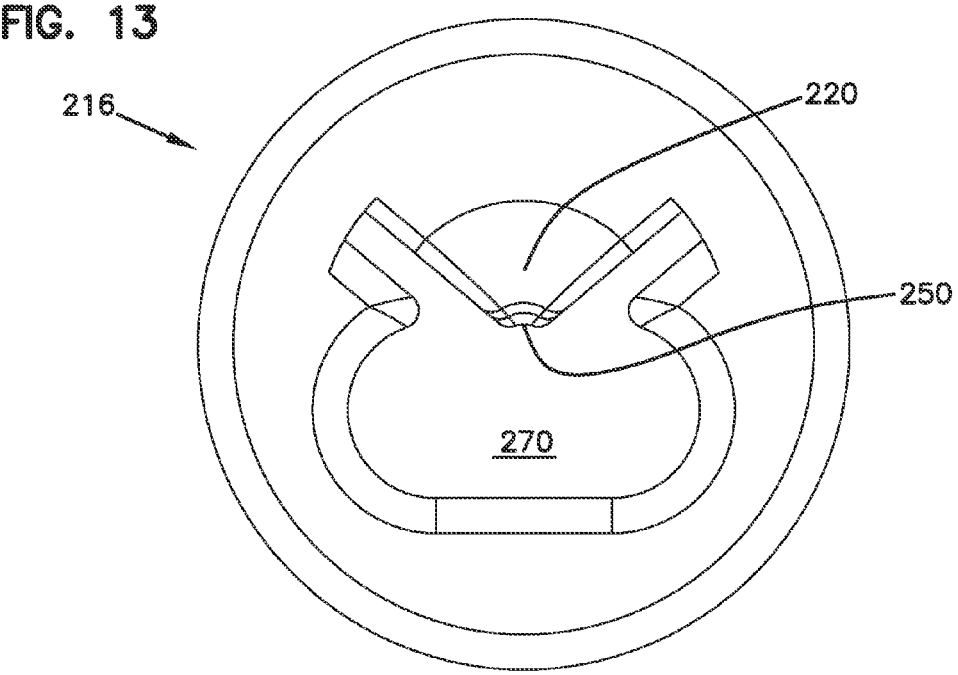

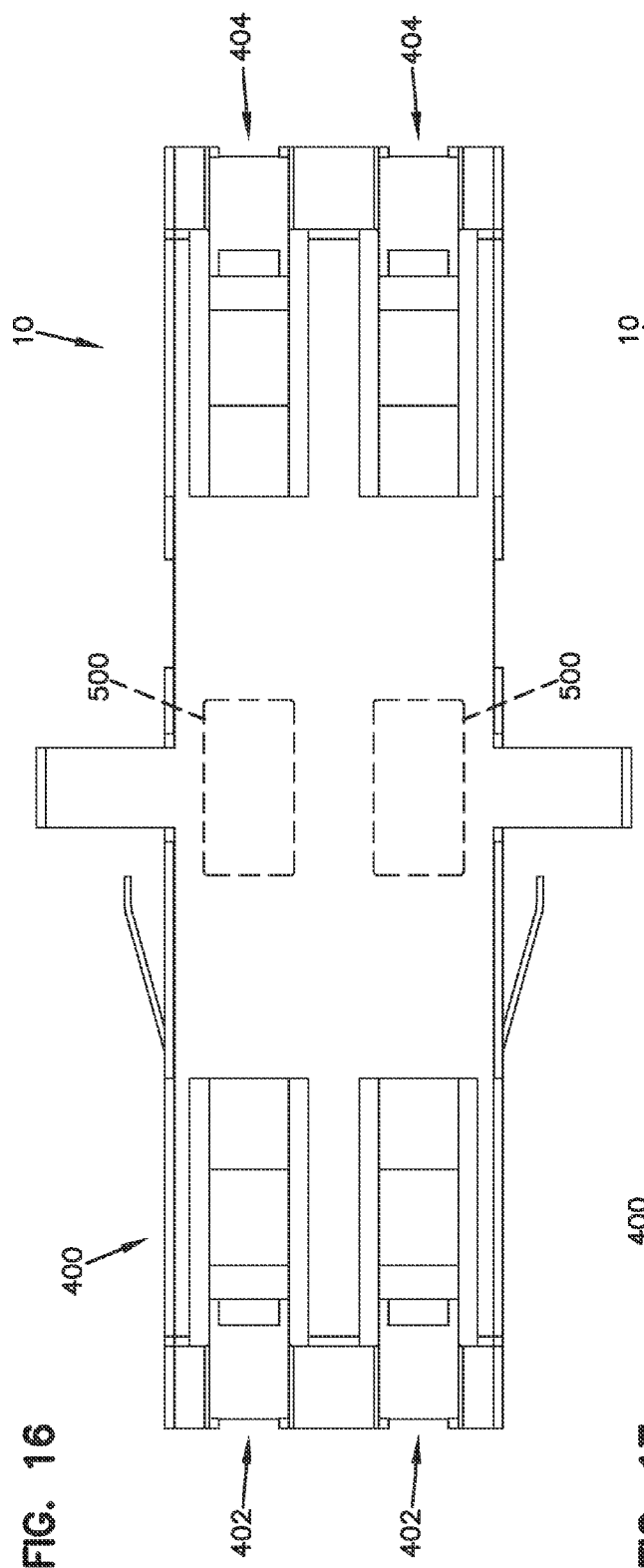
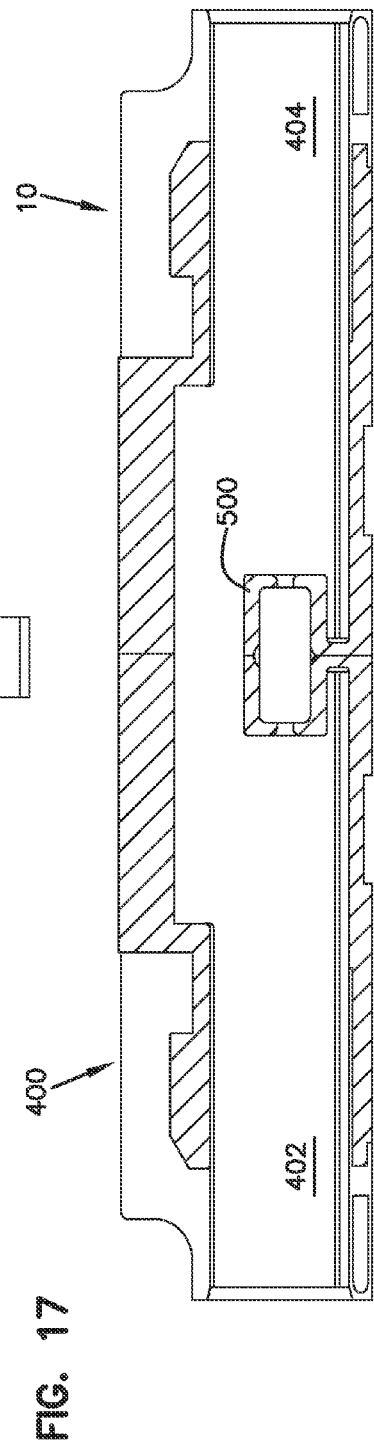

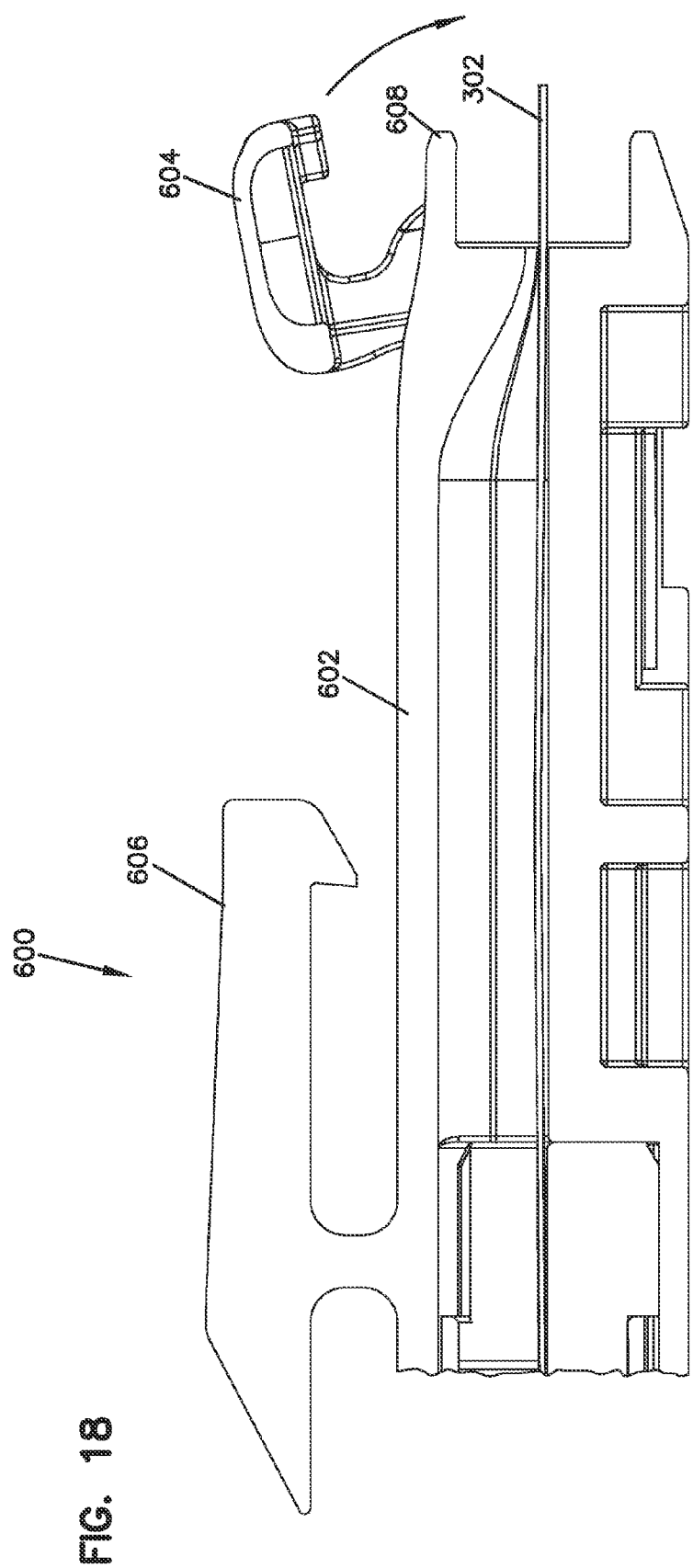

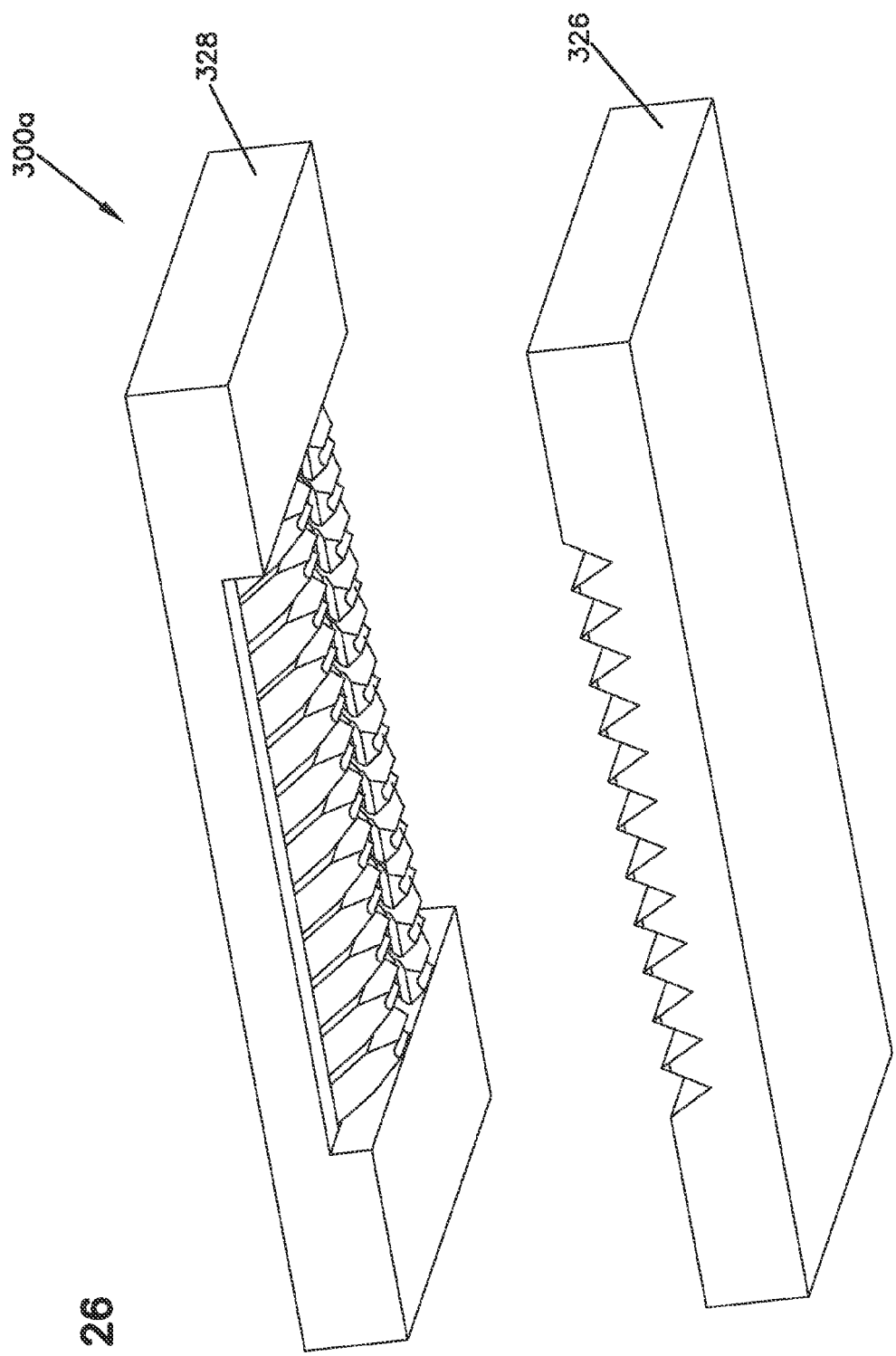

OPTICAL FIBER CONNECTION SYSTEM INCLUDING OPTICAL FIBER ALIGNMENT DEVICE

CROSS REFERENCE TO RELATED APPLICATIONS

This application is a National Stage Application of PCT/US2015/046188 filed on Aug. 20, 2015 and claims priority to U.S. Patent Application Ser. No. 62/052,816 filed on Sep. 19, 2014, and claims priority to U.S. Patent Application Ser. No. 62/092,021 filed on Dec. 15, 2014, the disclosures of which are incorporated herein by reference in their entireties. To the extent appropriate, a claim of priority is made to each of the above disclosed applications.

TECHNICAL FIELD

The present disclosure relates to optical fiber connection systems and to devices and methods for aligning two fibers end-to-end.

BACKGROUND

Modern optical devices and optical communications systems widely use fiber optic cables. Optical fibers are strands of glass fiber processed so that light beams transmitted through the glass fiber are subject to total internal reflection wherein a large fraction of the incident intensity of light directed into the fiber is received at the other end of the fiber.

Many approaches to achieve fiber alignment can be found in the prior art, among them are V-grooves and ferrules. Ferrule based alignment systems including include ferruled connectors which use cylindrical plugs (referred to as ferrules) that fit within an alignment sleeve (e.g., a cylindrical split sleeve with elastic characteristics) to perform fiber alignment. Precision holes are drilled or molded through the centers of the ferrules. Optical fibers are secured (e.g., potted) within the precision holes with polished ends of the optical fibers located at end faces of the ferrules. Precise fiber alignment depends on the accuracy of the central hole of each ferrule. Fiber alignment occurs when two ferrules are inserted into an alignment sleeve such that the end faces of the ferrules oppose one another and the optical fibers supported by the ferrules are co-axially aligned with one another. Normally, ferruled connectors use ceramic or metal ferrules in which the precision center holes are drilled. Disadvantageously, drilling of such a central hole that is accurate enough for aligning can be difficult. In addition, a connector containing a ferrule has very high manufacturing costs. Therefore looking for adequate alignment solutions containing ferrule-less connectors would be more desirable.

V-grooves are commonly used in prior-art ferrule-less fiber optic alignment devices. An example is the V-groove method described in U.S. Pat. No. 6,516,131 used for alignment of optical fiber ends. The V-groove is uni-directionally or bi-directionally tapered for enabling easy positioning of the fibers. Optical fibers are pressed into the V-grooves and line contact between the optical fibers and the surfaces of the V-grooves assists in providing precise alignment of the optical fibers. In one example, two optical fibers desired to be optically connected together are positioned end-to-end within a V-groove such that the V-groove functions to co-axially align the optical fibers. End faces of the aligned optical fibers can abut one another.

SUMMARY

One aspect of the present disclosure relates to a device and method for aligning two fibers end-to-end. Co-axial alignment can be provided between the optical fibers of two fiber optic connectors so as to provide an optical coupling between the optical fibers. In such an embodiment, the optical connectors can be ferrule-less optical connectors. Co-axial alignment can also be provided between the end of an optical fiber of a fiber optic cable and a stub end of an optical fiber supported by a ferrule. In certain embodiments, fiber alignment devices in accordance with the principles of the present disclosure can accurately align optical fiber while using a minimal number of parts to reduce cost and facilitate assembly.

The term "fiber" as used herein relates to a single, optical transmission element having a core usually having a diameter of 8-12 µm and a cladding usually having a diameter of 120-130 µm, wherein the core is the central, light-transmitting region of the fiber, and the cladding is the material surrounding the core to form a guiding structure for light propagation within the core. The core and cladding can be coated with a primary coating usually comprising one or more organic or polymer layers surrounding the cladding to provide mechanical and environmental protection to the light-transmitting region. The primary coating may have a diameter ranging e.g. between 200 and 300 µm. The core, cladding and primary coating usually are coated with a secondary coating, a so-called "buffer", a protective polymer layer without optical properties applied over the primary coating. The buffer or secondary coating usually has a diameter ranging between 300-1100 µm, depending on the cable manufacturer.

The term "light" as used herein relates to electromagnetic radiation, which comprises a part of the electromagnetic spectrum that is classified by wavelength into infrared, the visible region, and ultraviolet.

Index matching gel can be used with alignment devices in accordance with the principles of the present disclosure to improve the optical connection between the open light transmission paths of the first and second optical fibers. The index matching gel preferably has an index of refraction that closely approximates that of an optical fiber is used to reduce Fresnel reflection at the surface of the bare optical fiber ends. Without the use of an index-matching material, Fresnel reflections will occur at the smooth end faces of a fiber and reduce the efficiency of the optical connection and thus of the entire optical circuit.

A self-centering structure is provided in accordance with a fiber alignment system to align fibers from ferrule-less connector plugs or other structures. The fibers protruding from the plugs are guided and aligned by a self-centering device, including a cantilever member which projects at least partially at an angle toward the fiber axis.

The self-centering devices can be assembled in a module, such as positioned within a split sleeve or other structure, or held together by other methods, wherein each self-centering device includes at least one cantilever member.

In one example implementation, each self-centering device includes three cantilever members positioned around the fiber axis.

Preferably more than one self-centering device is provided per fiber. In one implementation, two self-centering structures are provided for each fiber.

In one example, if the self-centering structures are provided with a single cantilever member, the cantilever member presses the fiber toward a groove structure, such as a V-groove, or a gap or slot. The V-groove can be defined by two parallel rods.

In another example, if the self-centering structures are provided with plural cantilever members spaced around the fiber axis, the cantilever members press the fiber toward the other one or more cantilever members to centralize the fiber at the fiber axis.

BRIEF DESCRIPTION OF THE DRAWINGS

FIG. 11 is an exploded perspective view of the self-centering structure of FIG. 6;

FIG. 12 is an end view of a self-centering device of the self-centering structure of FIGS. 6-11;

FIG. 13 is an opposite end view of the self-centering device of FIG. 12;

FIG. 16 is a top view of a fiber optic adapter useable with the self-centering structures of FIGS. 1-15;

FIG. 17 is a cross-sectional side view of the fiber optic adapter of FIG. 16;

FIG. 18 is a cross-sectional side view of a fiber optic connector useable with the fiber optic adapter of FIGS. 16-17;

FIG. 26 is a perspective view of the self-centering structure of FIG. 19 shown having two parts.

DETAILED DESCRIPTION

Figure 1:
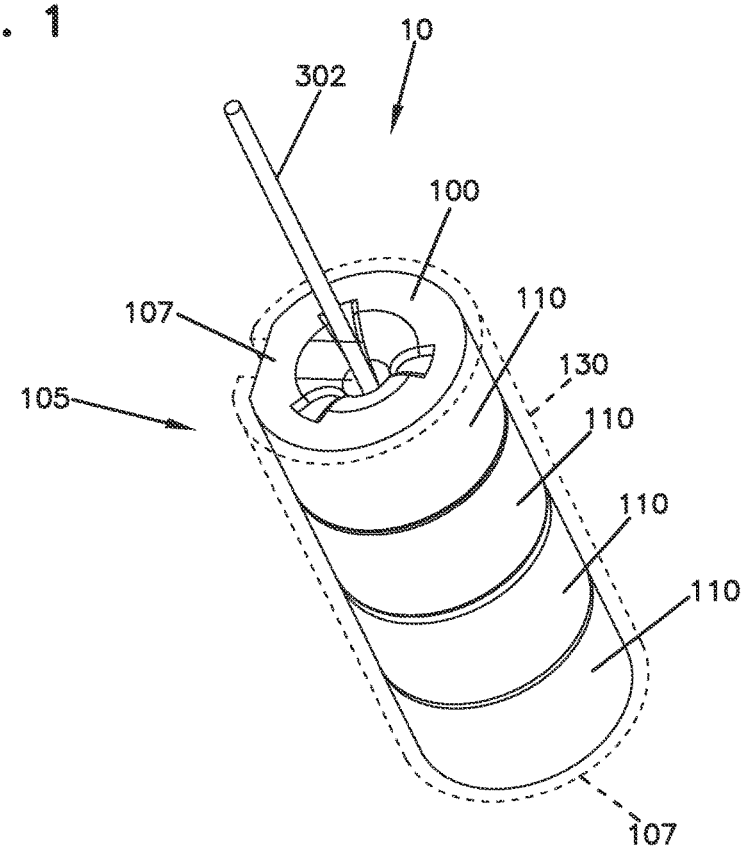
FIG. 1 is a first embodiment in perspective view of a self-centering structure for centering two optical fibers.
Figure 2:
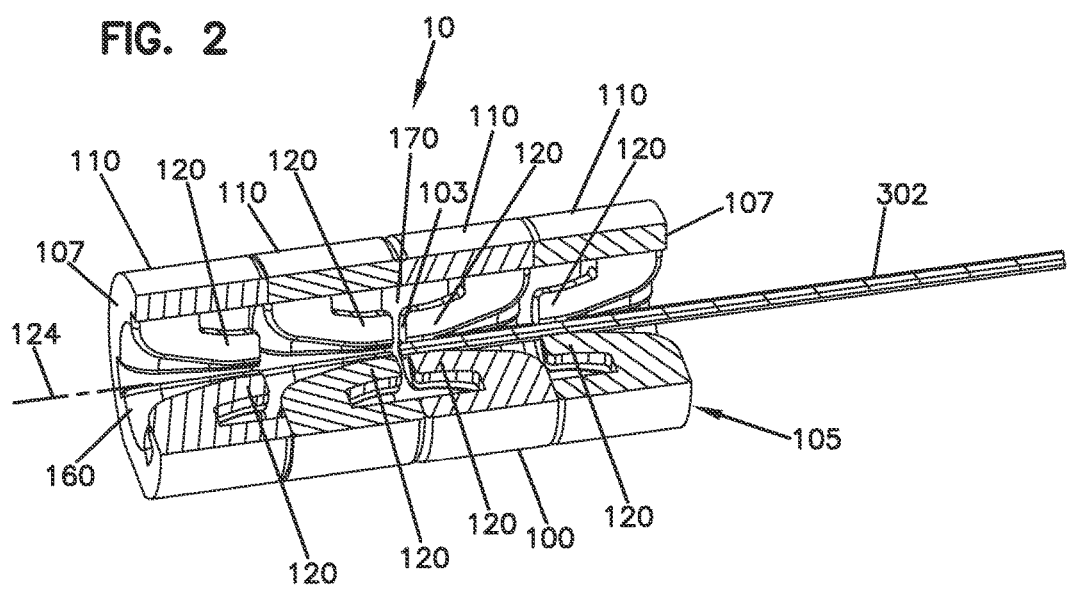
FIG. 2 is a partial cross-sectional perspective view of the self-centering structure of FIG. 1.
Figure 3:
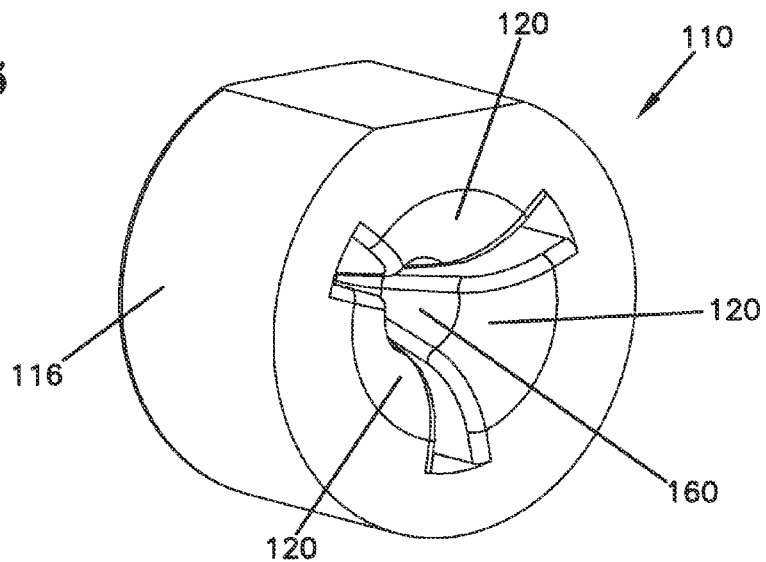
FIG. 3 is a perspective view of a self-centering device of the self-centering structure of FIGS. 1 and 2.
Figure 4:
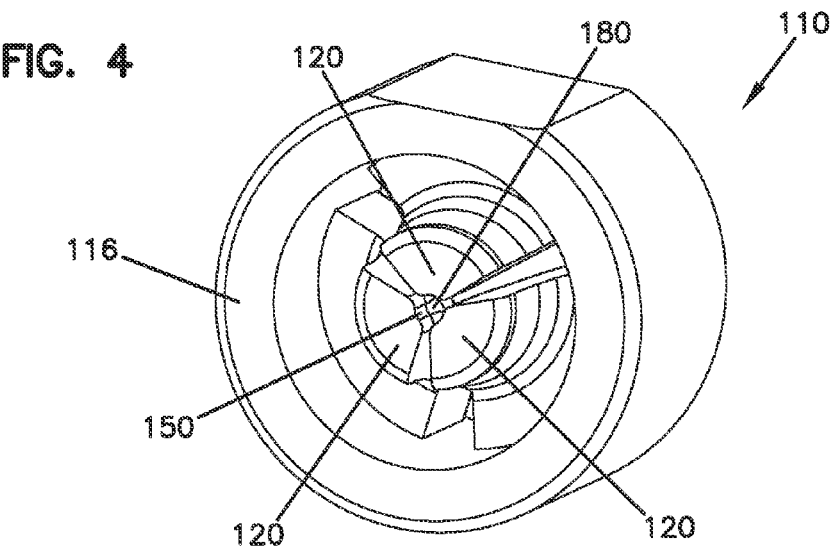
FIG. 4 is a perspective view of the self-centering device of FIG. 3.
Figure 5:
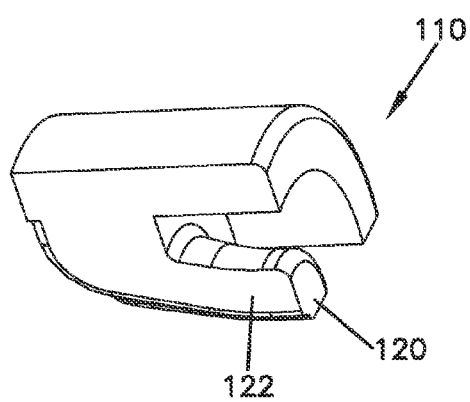
FIG. 5 is a sectional view of a portion of the self-centering device of FIGS. 3 and 4.
Figure 6:
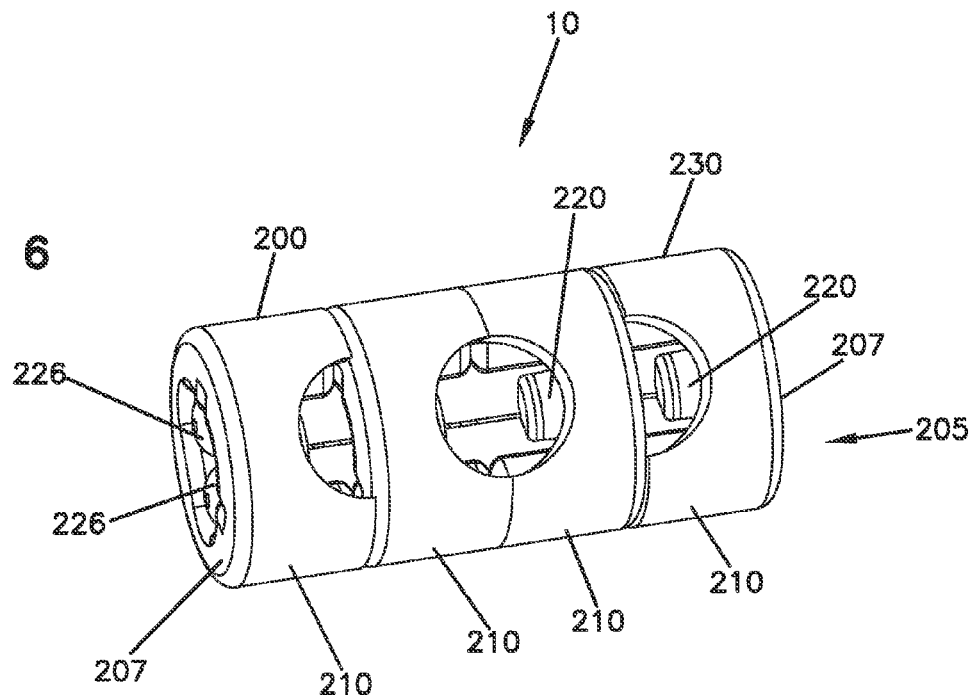
FIG. 6 is a second embodiment in perspective view of a self-centering structure for centering two optical fibers.
Figure 7:
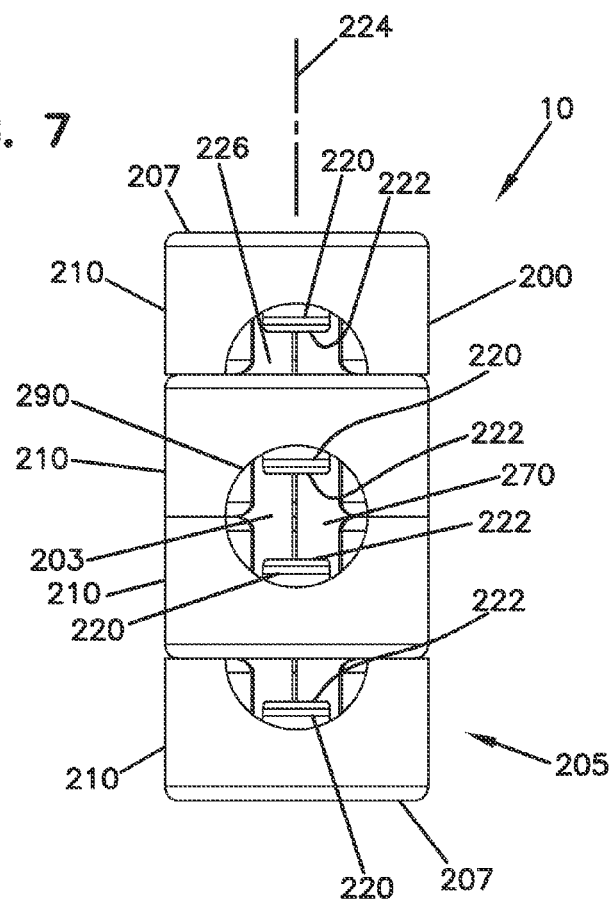
FIG. 7 is a top view of the self-centering structure of FIG. 6.
Figure 8:
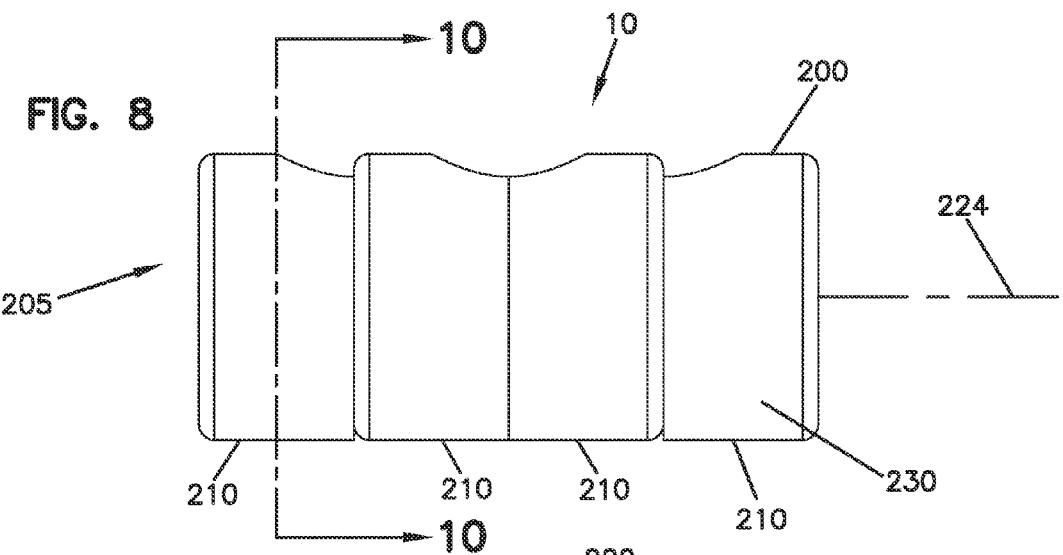
FIG. 8 is a side view of the self-centering structure of FIG. 6.
Figure 9:
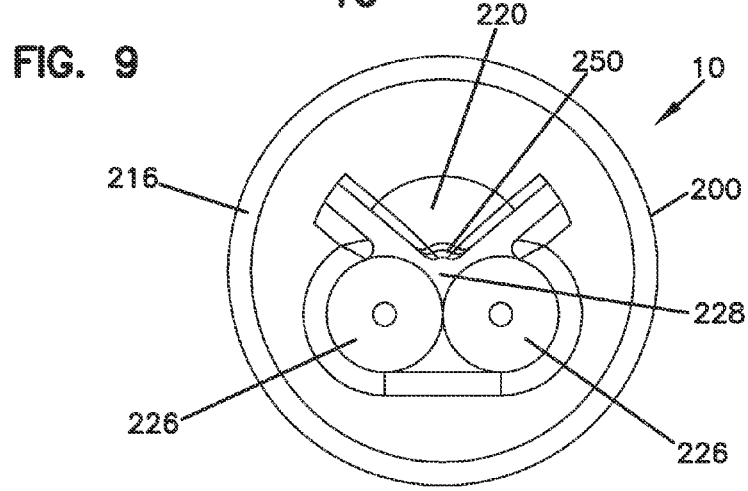
FIG. 9 is an end view of the self-centering structure of FIG. 6.
Figure 10:
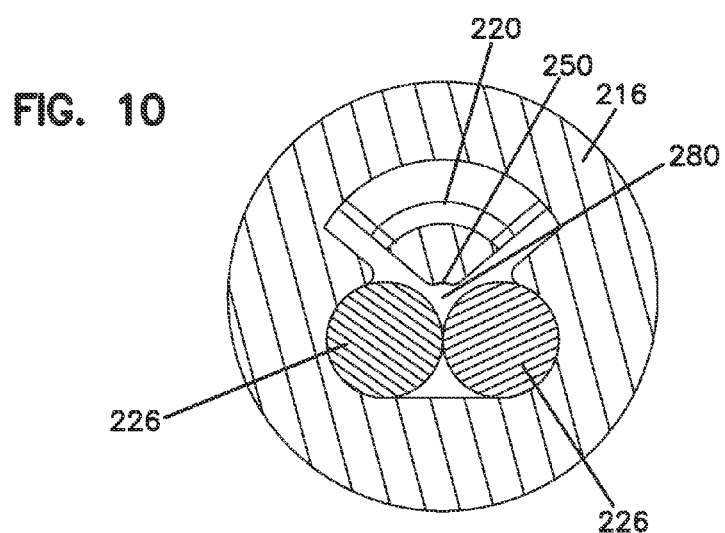
FIG. 10 is a cross-sectional end view of the self-centering structure of FIG. 6 taken along lines 10-10 of FIG. 8.
Figure 14:
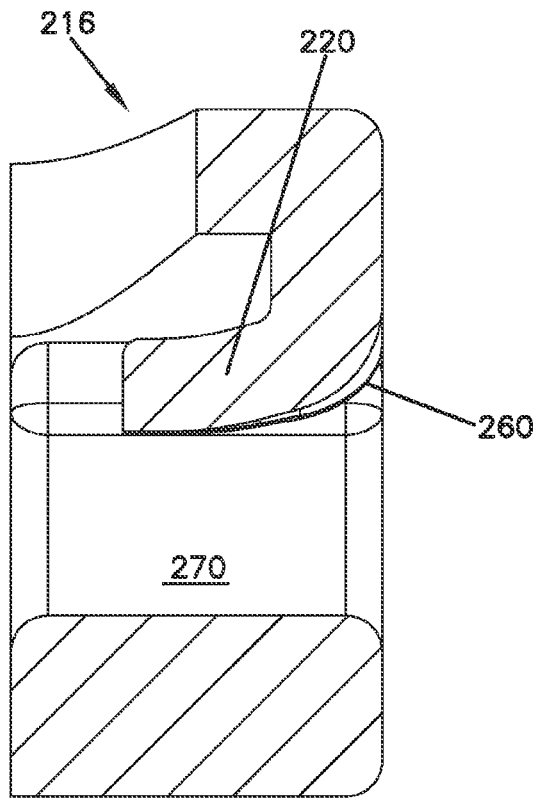
FIG. 14 is a first cross-sectional view of the self-centering device of FIG. 12 taken along lines 14-14.
Figure 15:
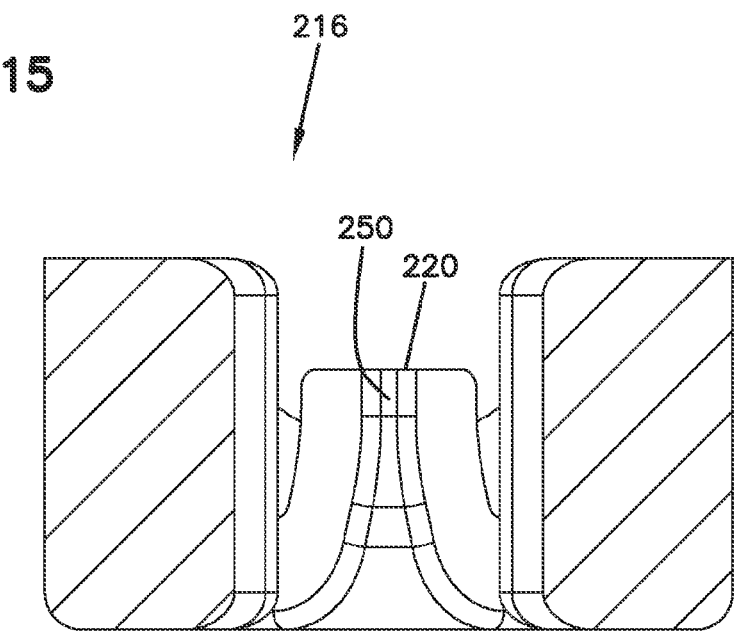
FIG. 15 is a second cross-sectional view of the self-centering device of FIG. 12 taken along lines 15-15.

A self-centering structure 100, 200 is provided in accordance with a fiber alignment construction or system 10 to align fibers from ferrule-less connector plugs 600 or other structures. The fibers 302 protruding from the plugs are guided and aligned by a self-centering device 110, 210, including at least one cantilever member 120, 220 which projects at least partially at an angle toward the fiber axis 124, 224, and terminates at a distal end 122, 222. The cantilever members 120, 220 are flexible to centralize the fiber 302 for alignment with another fiber 302. FIGS. 2, 5, and 14 show the angling of the cantilever members. Such a construction allows for the funnel shape for fiber feeding, and for bending to create clamping forces on the fibers. The alignment construction 10 includes a fiber alignment region 103, 203 at an intermediate location between the first and second ends.

The self-centering structures can be assembled in a module or unit 105, 205, such as including a split sleeve 130 or other structure 230, wherein each self-centering structure includes at least one cantilever member 120, 220. Split sleeve 130 holds the separate parts together to form a single unit with an aligned fiber axis. Structure 230 is a press fit arrangement of the parts that remain as a single unit, also for maintaining the aligned fiber axis. Each unit 105, 205 includes opposite ends 107, 207.

In one example implementation, each self-centering structure 100 includes three cantilever members 120.

Preferably more than one self-centering device 110, 210 is provided per fiber. In one implementation, two self-centering devices 110, 210 are provided for each fiber.

If the self-centering structures 200 are provided with a single cantilever member 220, the cantilever member 220 presses the fiber toward a groove structure, such as a V-groove 228, or a gap or slot defined by two parallel rods 226.

If the self-centering structures 100 are provided with plural cantilever members 120, the cantilever members 120 press the fiber toward the other one or more cantilever members to centralize the fiber.

The self-centering devices 110, 210 each define a funnel shape 160, 260 to facilitate entry of the fiber 302 along the fiber axis 124, 224 or fiber alignment axis. The self-centering devices 110, 210 are positioned front to back in a stack for single fiber alignment (same direction of projection of the cantilever members). The pairs of stacked self-centering devices 110, 210 are positioned front to front relative to the centerline mating plane for alignment of two fibers end to end (opposite direction of projection of the cantilever members).

With the example embodiments showing four self-centering devices, the outer two serve as a pre-alignment structure. The inner two align the two mating fibers. At the contact zone, a gap 170, 270 is desired between the opposing cantilever members 120, 220 from opposite self-centering devices 110, 210. The gap can range from 100 microns to 1 millimeter. Less than or equal to 1 millimeter is desired. Less than or equal to 750 microns is more preferred, and less than or equal to 500 microns, and even less than 100 microns is useful. The gap avoids interference and allows for good fiber alignment. Index matching gels or oils can be used in the self-centering structures 100, 200. Hole 290 can be used to apply the index matching material.

In the case of self-centering device 110, the component can be made as an integral body 116, including the three cantilever members 120. In the case of self-centering device 210, the component can be made as an integral body 216 with the single cantilever member 220, and a passage 270. Passage 270 receives the two parallel rods 226 in a press-fit manner.

Integral bodies 116, 216 can be made from molded materials. Central passage 180, 280 through the structures 100, 200 is preferably smaller than the outer diameter of the fiber. In one example, forces in the range of 0.1-0.2 Newtons can be generated on the fiber 302 for alignment and centering.

Distal ends 122, 222 of cantilever members 120, 220 include a small center groove 150, 250 to facilitate centering and alignment of the fibers.

The self-centering structures 100, 200 can be used in an adapter 400. Adapter 400 receives at least on connector 600 on each end 402, 404 for defining a signal path between the two fibers 302 of the two connectors 600. The self-centering structures 100, 200 can be placed in alignment areas 500 within adapter 400. In the example shown, adapter 400 is a duplex adapter for joining two fibers, with each end 402, 404 receiving two connectors 600.

Connector 600 is an example connector, such as further shown in PCT Publication WO2013/117598, the disclosure of which is incorporated by reference. Connector 600 includes a connector body 602, and a moveable cover 604. A latch 606 latches the connector 600 to the adapter 400. Fiber 302 is shown protruding from the front end 608 of connector 600.

The optical fiber alignment devices can be incorporated into both ends of a fiber optic adapter. The optical fiber alignment devices can be incorporated into an adapter wherein the fiber optic adapter receives a ferrule-less connector on one end and a ferruled connector on an opposite end. The optical fiber alignment devices can also be incorporated into a converter for converting a ferrule-less connector into a ferruled connector.

Figure 19:
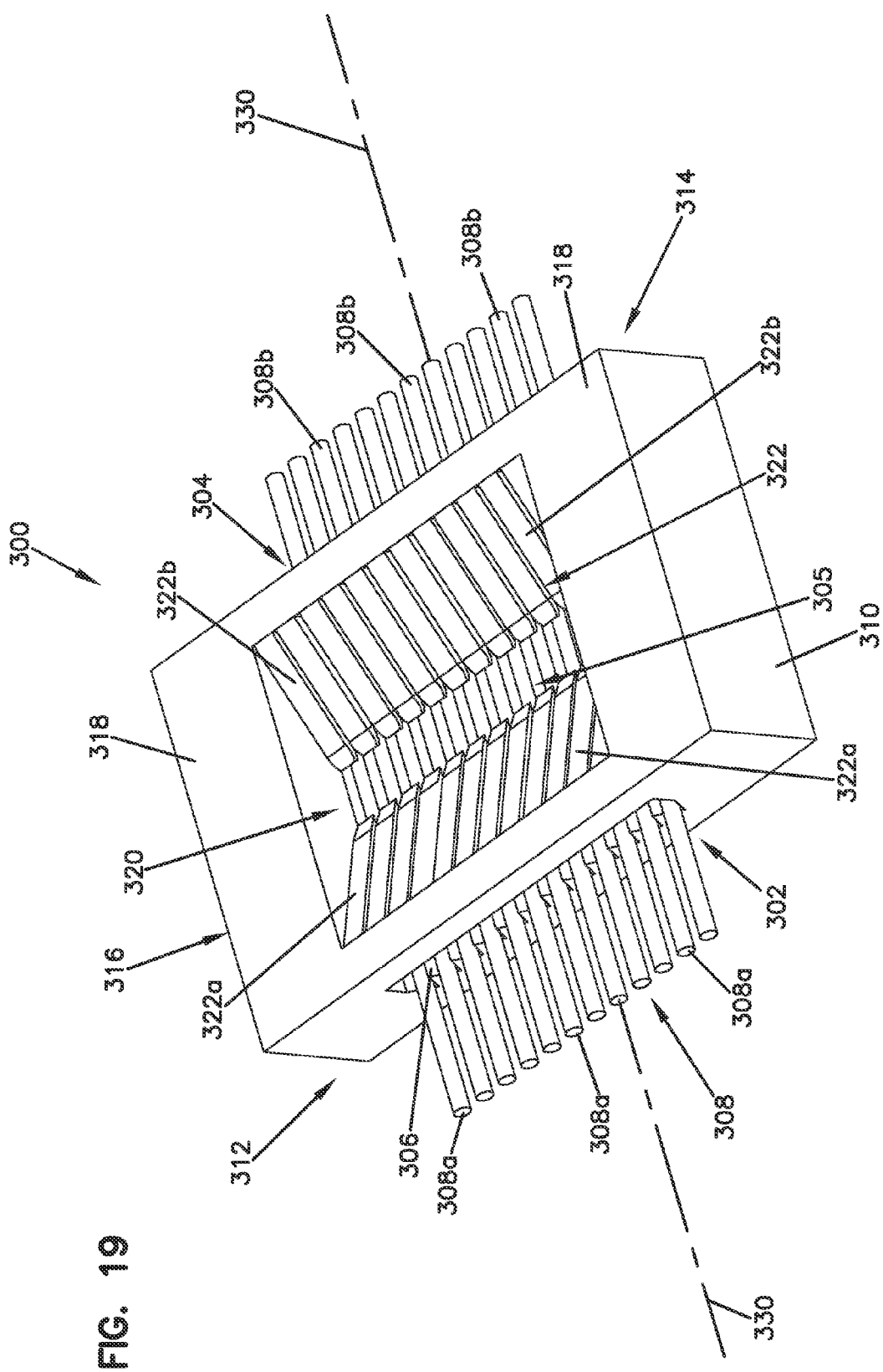
FIG. 19 is a third embodiment in perspective view of a self-centering structure for centering two optical fibers.

In other examples, it may be desired to include another alignment structure for fiber optic ribbon cables. The alignment structure can be used to align each of the optical fibers as part of a process to optically connect each of the optical fibers precisely to a fiber optic connector. The optical fibers are held in alignment when provided in the ribbon matrix. FIG. 19 shows an example alignment self-centering structure 300 in accordance with a fiber ribbon alignment construction or system to align fibers from ferrule-less connector plugs or other structures. In one example, a fiber optic ribbon cable may include a plurality of optical fibers 308. Each of the plurality of optical fibers 308 includes a fiber axis 330 and each of the plurality of optical fibers 308 includes a bare optical fiber and a coating surrounding the bare optical fiber to form an external surface of the optical fiber.

The self-centering structure 300 can be made from molded materials. The self-centering structure 300 includes a body 310 having a first end 312, a second end 314, a top 316 and a bottom 311. The first end 312 defines a first opening 303 and the second end 314 defines an opposite second opening 304. The first and second openings 303, 304 each provide for optical fibers 308 to be centered and oriented in the bottom 311 of the self-centering structure 300. The bottom 311 has a plurality of groove structures 306 integrally formed, such as a V-grooves, or gaps, or slots. It will be appreciated that the groove structures 306 can include other groove profiles using various materials and manufacturing processes.

Figure 20:
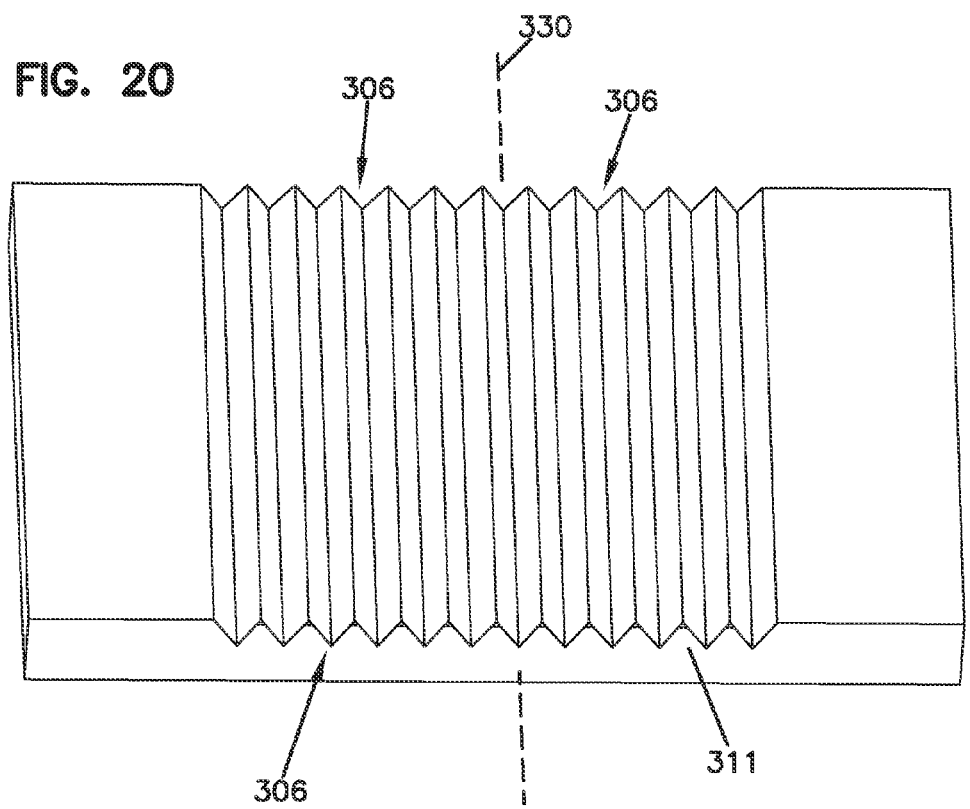
FIG. 20 is a top view of a portion of the self-centering device of FIG. 19.
Figure 21:
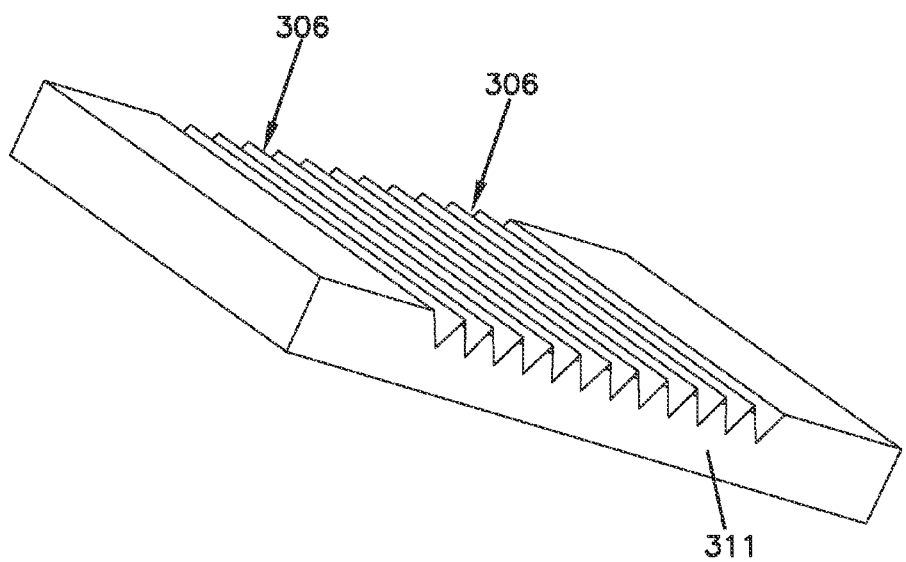
FIG. 21 is a side perspective view of FIG. 20.

FIGS. 20-21 show the groove structures 306 in parallel alignment that extend along the fiber axis 330. Each of the plurality of optical fibers 308 may be inserted through the bottom 311 of the first and second openings 303, 304 such that the fibers are disposed within the groove structures 306 in a substantially uniform orientation to facilitate centering and alignment of a first plurality of optical fiber 308a with a second plurality of optical fiber 308b. In this manner, as a non-limiting example, the self-centering structure 300 provides an alignment of the first plurality of optical fibers 308a in the first opening 303 to the second plurality of optical fibers 308b in the second opening 304.

As depicted in FIG. 19, twelve optical fibers 308 are aligned in each of the first and second openings 303, 304 relative to one another. The first plurality of optical fibers 308a extend from the first opening 303 at the first end 312 into the self-centering structure 300 to align with the second plurality of optical fibers 308b extending from the second opening 304 at the second end 314 of the self-centering structure 300.

The top 316 of the body 310 of the self-centering structure 300 comprises a planar region 318. The planar region 318 contains a recess 320 including a plurality of cantilever members 322. In one example, the plurality of cantilever members 322 extend from the planar region 318 and project at least partially downward at an angle toward the optical fibers 308. It will be appreciated that the plurality of cantilever members 322 may be configured to press the optical fibers in the grooves without being angled down. For example, a cantilever member may include a bump (e.g., projection) that extends from the body of the cantilever to engage the fibers and press the fibers into a respective groove.

Referring again to FIG. 19, a first set of cantilever members 322a are generally on the first end 312 of the self-centering structure 300 and can extend downwardly in the recess 320 at an angle toward the first plurality of optical fibers 308a at the first opening 303. A second set of cantilever members 322b are generally on the second end 314 of the self-centering structure 300 and can extend downwardly at an angle toward the second plurality of optical fibers 308b at the second opening 304. As described above, the arrangement and configuration of the first and second plurality of cantilever members 322a, 322b may vary in other embodiments such that they do not angle downward into the recess 320.

In one example, the first set of cantilever members 322a are flexible and configured for urging each of the first plurality of optical fibers 308a into their respective groove structures 306 and the second set of cantilever members 322b are flexible and configured for urging each of the second plurality of optical fibers 308b into their respective groove structures 306. In other words, the first and second sets of cantilever members 322a, 322b respectively align the first and second plurality of optical fibers 308a, 308b to one another.

Figure 22:
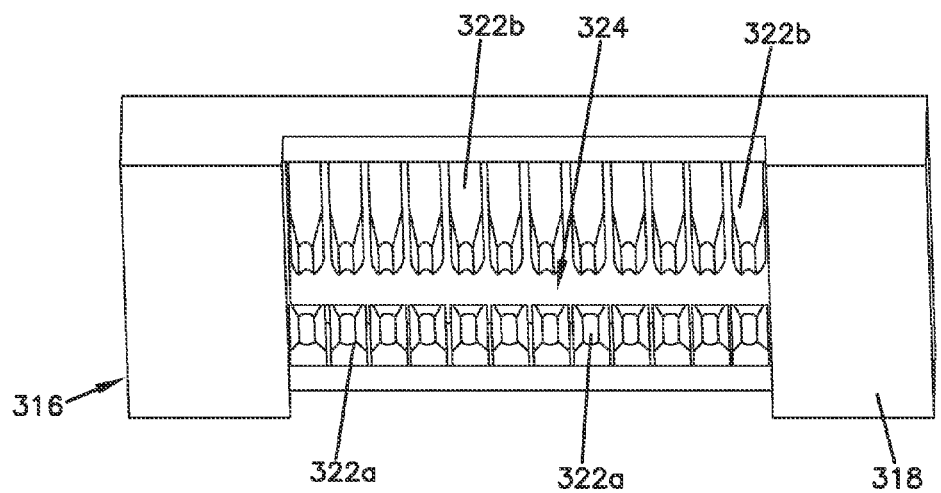
FIG. 22 is a front perspective view of a portion of the self-centering device of FIG. 19.
Figure 23:
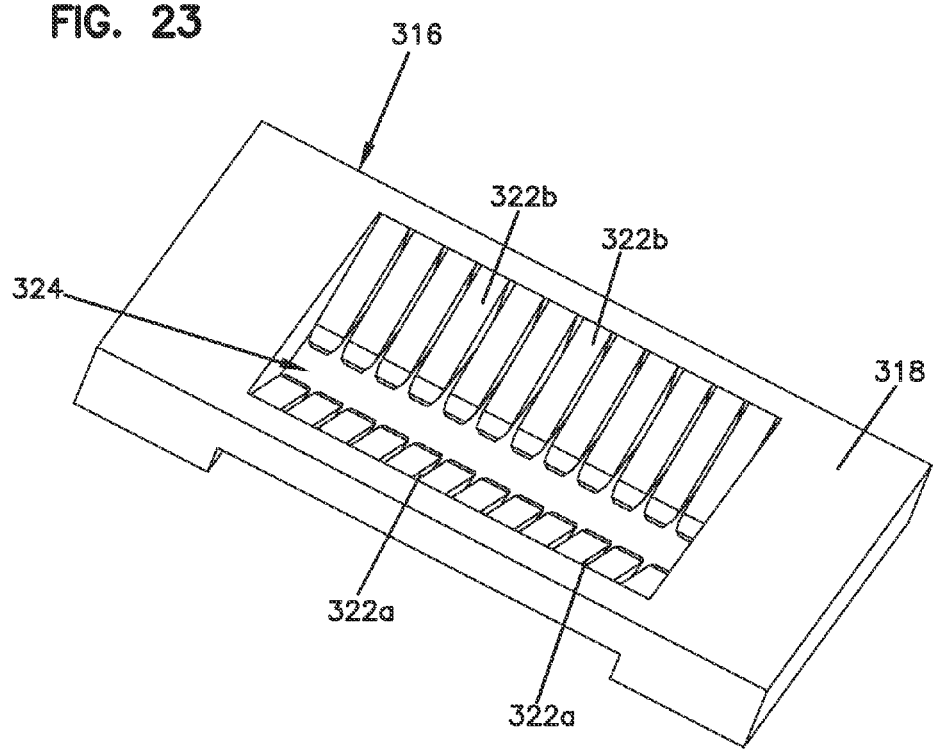
FIG. 23 is a top perspective view of FIG. 22.
Figure 24:
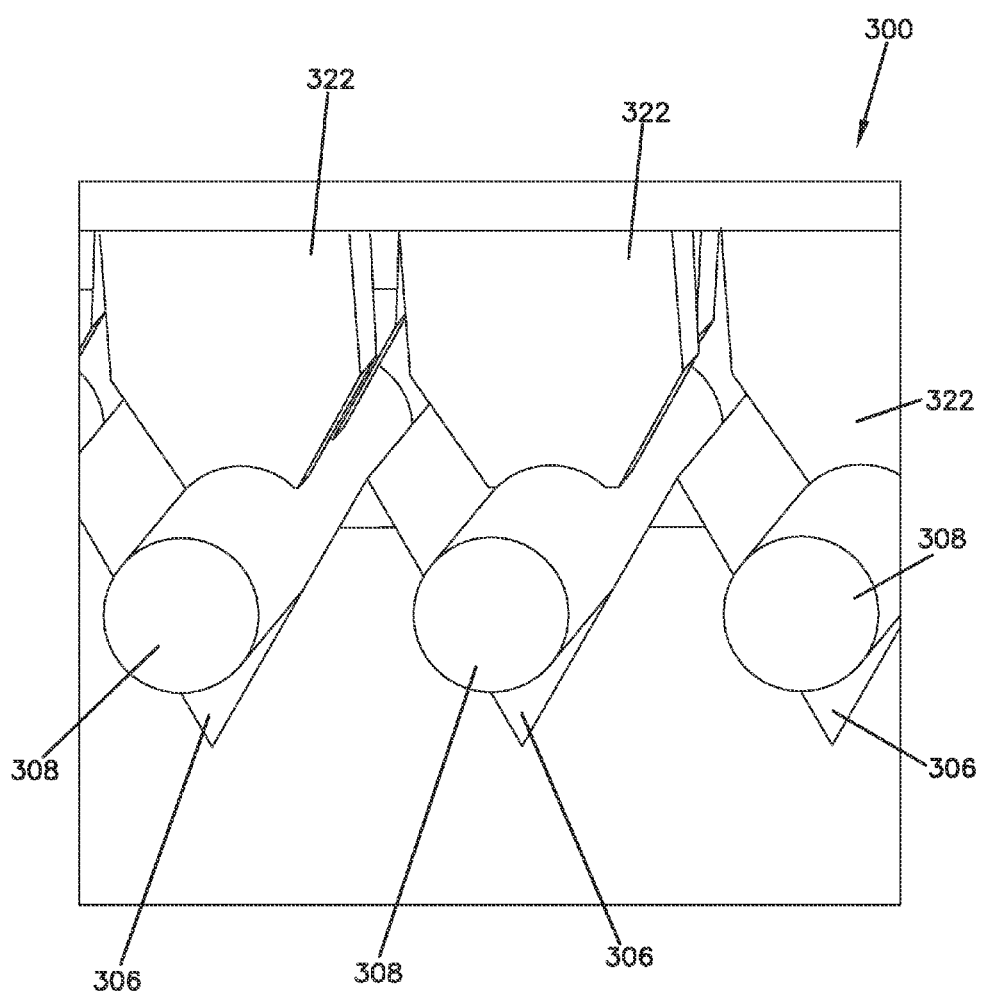
FIG. 24 is a front view of the self-centering device of FIG. 19.
Figure 25:
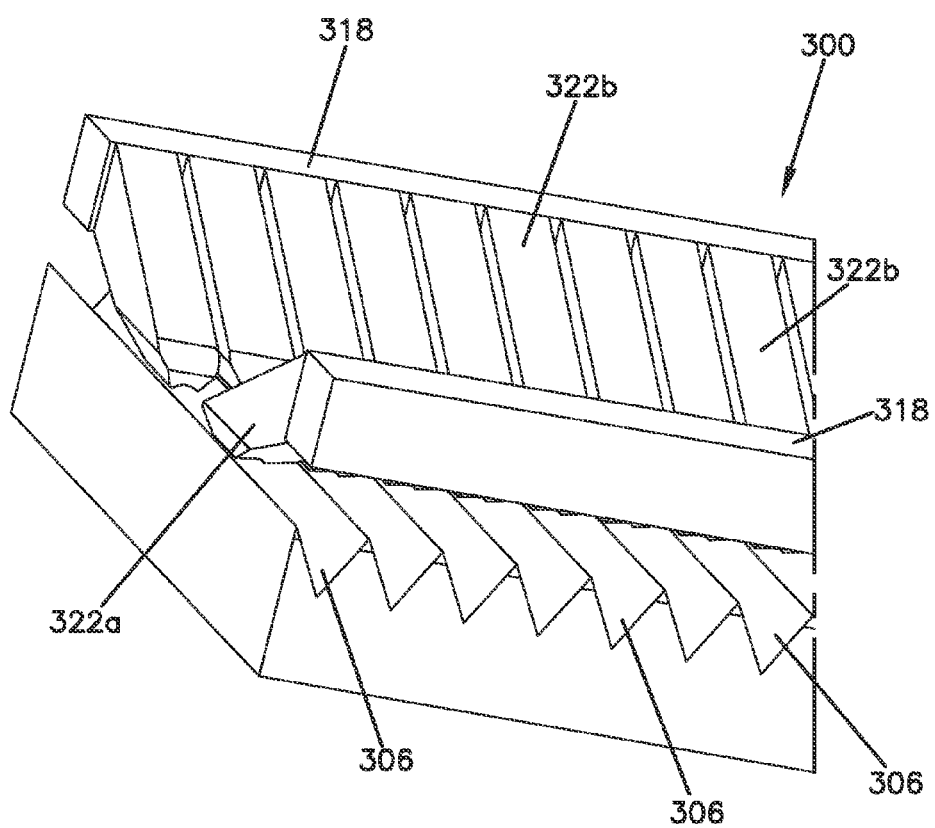
FIG. 25 is a sectional view of a portion of the self-centering device of FIG. 19 without the fibers.

Referring to FIGS. 22-23, the recess 320 has an open bottom 324 such that a fiber alignment region 305 (see FIG. 19) is made visible between the first and second sets of cantilever members 322a, 322b. The fiber alignment region 305 can help to facilitate centering and alignment of the optical fibers 308 with another optical fiber 308. The cantilever members are arranged and configured on opposite sides of the fiber alignment region 305. The cantilever members are shown having one row on each side of the fiber alignment region 305. It will be appreciated that other embodiments can include two or more rows on each side of the fiber alignment region 305. The cantilever members 322 are flexible to centralize the optical fibers 308 for alignment with another optical fiber 308 in the fiber alignment region 305. FIGS. 23 and 25 show one configuration of the cantilever members 322 being angled downward to allow for bending to create clamping forces on the optical fibers 308 while in the groove structures 306 as shown in FIG. 24. It will be appreciated that other arrangements and configurations of the cantilever members 322 may be used.

The self-centering structure 300 can be assembled as a single module or unit including the groove structures 306 and cantilever members 322. The self-centering structure 300 can be made as an integral body including the twelve cantilever members 322 and groove structures 306. In other examples, a self-centering structure 300a can include two parts as shown in FIG. 26. A first part 326 including the groove structures 306 and a second part 328 including the cantilever members 322. The first and second parts 326, 328 can be press fit together to form a single unit with an aligned fiber axis. The cantilever members 322 press the fibers toward the other respective cantilever members 322 to centralize the fibers.

From the forgoing detailed description, it will be evident that modifications and variations can be made without departing from the spirit and scope of the disclosure.

Parts List
10 Alignment construction
100 Self-centering structure
103 Fiber alignment region
105 Alignment construction
107 Ends
110 Self-centering devices
116 Integral body
120 Cantilever member
122 Distal end
124 Fiber axis
130 Split sleeve
150 Alignment groove
160 Funnel shape
170 Gap
180 Central passage
203 Fiber alignment region
205 Unit
207 Ends
210 Self-centering devices
216 Integral body
220 One cantilever member
222 Distal end
224 Fiber axis
226 Alignment rods
228 V-groove
230 Structure
250 Alignment groove
260 Funnel shape
270 Passage
280 Central passage
290 Hole
300 Self-centering structure
302 Fiber
303 First opening
304 Second opening
305 Fiber alignment region
306 Groove structure
308 Optical fibers
308a First plurality of optical fibers
308b Second plurality of optical fibers
310 Body
312 First end
311 Bottom
314 Second end
316 Top
318 Planar region
320 Recess
322 Cantilever members
322a First set of cantilever members
322b Second set of cantilever members
324 Open bottom
326 First part
328 Second part
330 Fiber axis
400 Adapter
402 End
404 End
500 Alignment areas
600 Connector
602 Connector body
604 Moveable cover
606 Latch
608 Front end

What is claimed is:

1. An optical fiber alignment device comprising:
an alignment housing including first and second cylindrical alignment pieces, the first and second cylindrical alignment pieces being positioned front to back in a stacked configuration to form an alignment construction including first and second ends, the alignment construction defining a fiber axis that extends through the alignment construction between the first and second ends, the alignment construction including a fiber alignment region at an intermediate location between the first and second ends; and
the first and second cylindrical alignment pieces respectively including first and second cantilever members for directly engaging and pressing first and second fibers toward the fiber axis;
wherein the first cantilever member is integrally formed with the first cylindrical alignment piece and the second cantilever member is integrally formed with the second cylindrical alignment piece.

2. The optical fiber alignment device of claim 1, wherein the alignment device is incorporated into a fiber optic adapter.

3. The optical fiber alignment device of claim 2, wherein the fiber optic adapter receives a ferrule-less connector on one end and a ferruled connector on an opposite end.

4. The optical fiber alignment device of claim 1, wherein the alignment device is incorporated into a converter for converting a ferrule-less connector into a ferruled connector.

5. The optical fiber alignment device of claim 1, wherein three first and three second cantilever members are provided for urging the fiber to an alignment position, each of the first cantilever members and each of the second cantilever members centered about the fiber axis.

6. The optical fiber alignment device of claim 1, further comprising:
first and second fiber alignment rods positioned within the alignment construction, the first and second fiber alignment rods cooperating to define a fiber alignment groove that extends along the fiber axis, the first and second fiber alignment rods each having rounded ends positioned at the first and second ends of the alignment construction.

7. The optical fiber alignment device of claim 1, wherein each one of the first and second cantilever members includes an alignment groove on a distal end thereof to facilitate centering and alignment of the first and second fibers.

8. The optical fiber alignment device of claim 1, further comprising a plurality of cantilever members at the first and second ends.

9. The optical fiber alignment device of claim 1, wherein first and second fiber alignment rods are respectively positioned within the first and second cylindrical alignment pieces of the alignment housing, the first and second fiber alignment rods cooperating to define a fiber alignment groove that extends along the fiber axis, the first and second cantilever members pressing the first and second fibers within the fiber alignment groove.

10. An optical fiber alignment device comprising:
   an alignment construction including first and second ends, the alignment construction defining a fiber axis that extends through the alignment construction between the first and second ends, the alignment construction including a fiber alignment region at an intermediate location between the first and second ends; and
   a first cantilever member for urging a first fiber toward the fiber axis;
   wherein the first cantilever member includes a center alignment groove on a distal end thereof to facilitate centering and alignment of the first fiber.

11. The optical fiber alignment device of claim 10, wherein the alignment device is incorporated into a fiber optic adapter.

12. The optical fiber alignment device of claim 11, wherein the fiber optic adapter receives a ferrule-less connector on one end and a ferruled connector on an opposite end.

13. The optical fiber alignment device of claim 10, wherein the alignment device is incorporated into a converter for converting a ferrule-less connector into a ferruled connector.

14. The optical fiber alignment device of claim 10, wherein three first and three second cantilever members are provided for urging the first fiber to an alignment position, each of the first cantilever members and each of the second cantilever members centered about the fiber axis.

15. The optical fiber alignment device of claim 10, further comprising:
   first and second fiber alignment rods positioned within the alignment construction, the first and second fiber alignment rods cooperating to define a fiber alignment groove that extends along the fiber axis, the first and second fiber alignment rods each having rounded ends positioned at the first and second ends of the alignment construction.

16. The optical fiber alignment device of claim 10, further comprising an alignment housing including a first cylindrical alignment piece, wherein the first cantilever member is integrally formed with the first cylindrical alignment piece.

17. A self-centering structure for aligning optical fibers desired to be optically coupled together comprising:
   a body including a first end, a second end, and a bottom, wherein the first end defines a first opening, and the second end defines a second opening;
   a plurality of groove structures integrally formed in the bottom of the body of the self-centering structure for receiving the optical fibers, the plurality of groove structures extending between the first and second ends of the body;
   a fiber alignment region positioned at an intermediate location between the first and second ends of the body to facilitate centering and alignment of the optical fibers; and
   a biasing plate including a plurality of cantilever members formed as one unitary piece with the biasing plate, the plurality of cantilever members being arranged and configured on opposing sides of the fiber alignment region, each of the plurality of cantilever members being aligned with a respective one of the plurality of groove structures in the bottom of the body; the plurality of cantilever members including a first set of a plurality of cantilever members adjacent the first end of the self-centering structure and a second set of a plurality of cantilever members adjacent the second end of the self-centering structure;
   wherein the plurality of cantilever members are flexible and configured for urging the optical fibers into their respective groove structures.

18. The self-centering structure of claim 17, wherein the self-centering structure is one single module.

19. The self-centering structure of claim 17, wherein the self-centering structure includes two separate parts.

20. The self-centering structure of claim 17, wherein each of the plurality of cantilever members project at least partially downward at an angle toward the optical fibers.

21. The self-centering structure of claim 17, wherein each of the plurality of groove structures extend along a fiber axis.

22. The self-centering structure of claim 17, wherein the plurality of cantilever members each include a proximal end that is integral with the biasing plate and a distal end that is a free end, the distal end of the plurality of cantilever members being angled downwardly.

23. A fiber alignment device comprising:
   a structure defining a plurality of parallel fiber alignment grooves; and
   a biasing plate configured to press optical fibers into the plurality of parallel fiber alignment grooves, the biasing plate including a main body and first and second sets of resilient cantilevers having free ends for pressing the optical fibers into the plurality of parallel fiber alignment grooves, the first and second sets of resilient cantilevers having base ends unitarily formed with the main body of the biasing plate;
   the first and second sets of resilient cantilevers being oriented in opposite directions with the free ends of the first set of resilient cantilevers opposing the free ends of the second set of resilient cantilevers.

* * * * *